(12) United States Patent
Mickelson et al.

(10) Patent No.: US 7,261,606 B2
(45) Date of Patent: Aug. 28, 2007

(54) FLOTATION APPARATUS

(76) Inventors: Eric Mickelson, 430 York Dr., Benicia, CA (US) 94510; C. Bart Sullivan, 1543 Sherman Dr., Benicia, CA (US) 94510

( * ) Notice: Subject to any disclaimer, the term of this patent is extended or adjusted under 35 U.S.C. 154(b) by 0 days.

(21) Appl. No.: 11/300,523

(22) Filed: Dec. 14, 2005

(65) Prior Publication Data
US 2007/0135001 A1    Jun. 14, 2007

(51) Int. Cl.
*B63B 22/16* (2006.01)
(52) U.S. Cl. ............................... 441/6; 441/8
(58) Field of Classification Search ...................... None
See application file for complete search history.

(56) References Cited

U.S. PATENT DOCUMENTS

| 2,642,693 | A | * | 6/1953 | Broady | 441/6 |
| 3,071,787 | A | * | 1/1963 | Burker | 441/8 |
| 3,210,785 | A | * | 10/1965 | Ward | 441/9 |
| 4,586,456 | A | * | 5/1986 | Forward | 441/13 |
| 4,981,453 | A | * | 1/1991 | Krishan et al. | 441/6 |
| 5,218,366 | A | * | 6/1993 | Cardamone et al. | 441/11 |
| 5,857,881 | A | * | 1/1999 | Zippel, Sr. | 441/6 |
| 6,036,559 | A | * | 3/2000 | Arnold et al. | 441/8 |

* cited by examiner

*Primary Examiner*—Lars A. Olson
(74) *Attorney, Agent, or Firm*—C. Bart Sullivan

(57) ABSTRACT

A method and apparatus is provided to support a plurality of objects such as keys with an inflatable apparatus when the inflatable apparatus is exposed to a body of water. In one embodiment, an inflatable apparatus provides an attachment member such as a key ring to attach objects such as keys to the inflatable apparatus. The inflatable apparatus is capable of inflating from a compact shape to an expanded shape upon contact with water. In the expanded shape, the inflatable apparatus provides sufficient buoyancy to support the objects coupled therewith and float the objects to the surface of the water for retrieval by a user. In situations where the weight of the object exceeds a buoyancy limit, the inflatable apparatus can extend a marker buoy to assist in the retrieval of the objects. In other embodiments, the inflatable apparatus includes a wireless transmit a wireless location signal.

20 Claims, 7 Drawing Sheets

FLOTATION APPARATUS

BACKGROUND OF THE INVENTION

1. Field of the Invention

Embodiments of the present invention generally relates to flotation devices. More specifically, the present invention relates to flotation devices that automatically activate when exposed to water.

2. Description of the Related Art

Conventional flotation devices come in many shapes and sizes and are designed to float when they are placed in water. Many flotation devices are designed for specific purposes. For example, some flotation devices are designed for uses such as boating markers, swimming lane demarcation, fishing net support, etc. Some are used as safety devices such life jackets, life rings, floating tubes, etc. Other flotation devices such as beach balls, fishing bobbers, boat fenders, are used for sports, such as fishing, scuba diving, water skiing, sailing, swimming, etc.

Many flotation devices are designed to be inherently buoyant, such as the flotation rings mentioned above, bathtub toys, and the like, as they are often built with buoyant materials or cavities that contain sufficient air to provide buoyancy in water. Some inflatable life jackets and inflatable boats are designed to move from a deflated configuration to an inflated configuration when exposed to water. This allows the inflatable life jackets and inflatable boats to provide a more compact shape for storage or transport, and in the case of the life jacket, may make wearing a life jacket more comfortable for the user.

Some flotation devices are specifically used to provide buoyancy to items such as keys, key chains, etc. For example, a piece of foam is often used to provide buoyancy to key chains used to hold a boating motor ignition key, storage locker key, vehicle key, key FOB, keys used to unlock doors of homes, offices, garage doors, and the like. In one case, a small piece of foam with a key ring attached is available for boaters and others who engage in marine activities. Unfortunately, the small piece of foam is often cumbersome and too large to hold in a pocket. In addition, there are often so many keys on the key ring that it cannot support the weight, and can sink if dropped into a body of water.

Therefore, what is needed is an inflatable apparatus that is easy to store in a pocket or purse and that can easily support the weight of objects attached thereto when placed into a body of water.

SUMMARY OF THE INVENTION

Embodiments of the present invention provide an apparatus, which includes a body having an outer wall defining a first gas chamber and a second gas chamber, separated by an inner wall, and a water pressure activated latching valve having a sealing end disposed in the first gas chamber. The sealing end is configured to seal an opening disposed in the inner wall to prevent gas disposed in the first gas chamber from escaping into the second chamber until the pressure activated valve is activated by water pressure. The apparatus also includes an inflatable membrane disposed in the second chamber. When the pressure activated latching valve is activated by water pressure communicated though an opening in the outer wall to an exterior side of the membrane, the pressurized gas disposed in the first gas chamber is communicated though the opening in the inner wall to inflate the membrane. In response to the pressurized gas, the inflatable membrane extends outside the body though the opening in the outer wall. The apparatus also includes a wireless communication module configured to provide a location wireless signal in response to an external input or activation of inflatable membrane.

In one embodiment, the present invention provides an inflatable apparatus. The apparatus includes a body having a first chamber and a second chamber, a movable wall slidably disposed in the first chamber, a shaft attached to the movable wall on a first end, and an internal wall disposed within the body to separate the first chamber from the second chamber. The internal wall includes a first opening sized to allow the shaft to pass therethrough. The apparatus also includes a water dissolvable member disposed in the first opening. Another end of the shaft distal the first end abuts the water dissolvable member. When the dissolvable member is not dissolved by water, the dissolvable member in a first position holds the movable wall. When the water dissolvable member is dissolved by water, the shaft is capable of passing through the first opening to position the movable wall in a second position. The apparatus further includes an inflatable member disposed in the first chamber between the movable wall and a wall of the first chamber. When the dissolvable member is not dissolved, the inflatable member is enclosed in the first chamber by the movable wall. When the dissolvable member is dissolved, at least a portion of the inflatable member expands from the first chamber to an exterior position though a second opening in a second wall of the body.

In another embodiment, the present invention provides an inflatable apparatus configured to hold keys and other items. The apparatus includes an enclosure, an inflatable membrane disposed within the enclosure, and an inflation activation apparatus configured to move from a ready state to an activation state when the apparatus is submerged in a body of water. During the activation state, the inflatable membrane expands through an opening in an outer wall of the enclosure to provide buoyancy for the apparatus in the body of water. The apparatus also includes a latching mechanism configured to prevent the inflation activation apparatus from returning to the ready state, and a wireless transmitter integral to the enclosure. The wireless transmitter is configured to provide a user selected wireless signal in the ready state or a location signal in response to the activation state.

BRIEF DESCRIPTION OF THE DRAWINGS

A further understanding of the present invention can be obtained by reference to a preferred embodiment set forth in the illustrations of the accompanying drawings. Although the illustrated embodiment is merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the present invention, reference is now made to the accompanying drawings in which.

DETAILED DESCRIPTION OF THE PREFERRED EMBODIMENT

Embodiments of the present invention provide a flotation device that is generally sized to fit in a user's pocket or purse. When immersed in a body of water, the flotation device provides buoyancy to articles such as keys and other items attached thereto. The flotation device has two states, a ready state where the flotation device is in a compact state, and an inflated state where the flotation device is configured to provide a flotation member. In one configuration, upon immersion into water, an inflatable membrane expands from within the flotation device to an external position outside the flotation device to form the flotation member.

In one embodiment, the flotation device includes an enclosure having two chambers. A first chamber holds a pressurized gas. The pressurized gas may be delivered under pressure and/or formed from a chemical reaction, and the like. A second chamber holds the inflatable membrane. The flotation device includes an inner wall that separates the two chambers. The inner wall includes a sealable opening that when unsealed allows pressurized gas to flow from the first chamber to the second chamber to inflate the inflatable membrane. An inflation activation device is configured to seal the opening between the chambers to prevent the inflatable member from inflating until the inflatable device is immersed in water. When the flotation device is immersed in water, the inflation activation device unseals the opening to allow the inflatable membrane to expand. The inflatable device has an opening to allow the inflatable membrane to expand outside the inflatable device to form the flotation member.

Figure 1:
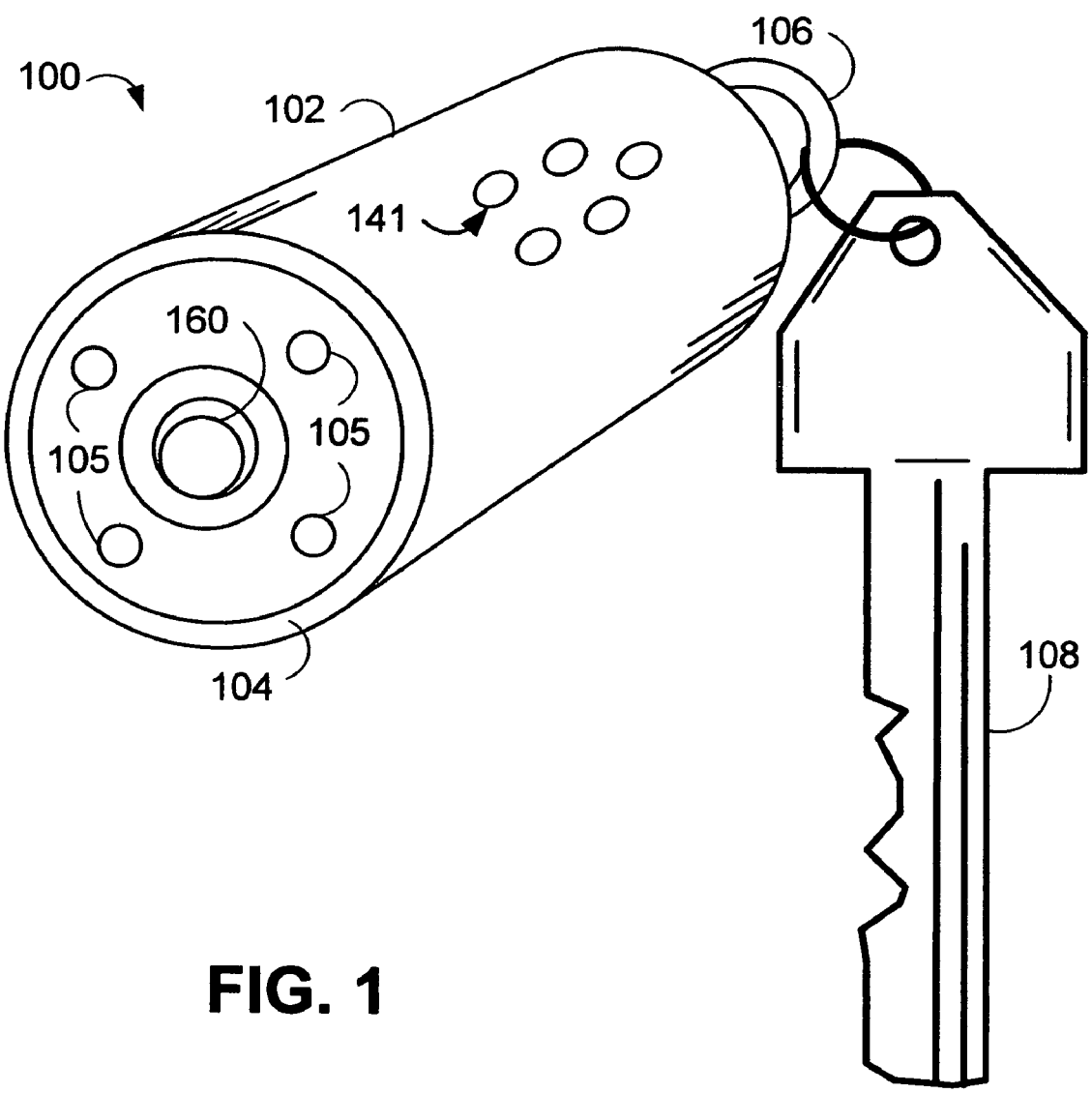
FIG. 1 is a perspective view of one embodiment of an inflatable apparatus in accordance with embodiments of the invention.

FIG. 1 is a perspective view of one embodiment of an inflatable apparatus 100 in accordance with embodiments of the invention. In one embodiment, inflatable apparatus 100 includes an enclosure 102 having a lid 104 and an attachment member 106. The attachment member 106 is capable of providing a structure for attaching virtually any attachable object such as keys, key fobs, chains, briefcases, cords, and the like, to the inflatable apparatus 100. For example, attachment member 106 as illustrated is in the form of a key ring holding a key 108. Those skilled in the art will appreciate that attachment member 106 could be any attachment device such as VELCO, snap ring, hook, screw, terminal, loop, and the like configured to connect the inflatable apparatus 100 to another object.

The enclosure 102 may be shaped in any form that may be used to advantage. Illustratively, in FIG. 1, the enclosure 102 is shown cylindrical in shape. A cylindrical shape may provide an advantage, as cylindrical shapes may provide better support for pressurized gas stored therein than a rectangular body, however, a body of any shape may be used. The enclosure 102 may be made of any number and/or combinations of suitable materials. For example, the enclosure 102 may include plastic, metal, graphite, wood, rubber, and other materials that may be used to advantage.

In one embodiment, the enclosure 102 includes keypad 141. Similar to a key FOB, keypad 141 may be used to facilitate wireless communication with communication systems of vehicles, garage door openers, televisions, DVD players, audio systems, alarm systems, lighting systems, and the like. Keypad 141 may be a plastic terminal key that are waterproof but capable of providing a tactile touch to a user thereof. For example, keypad 141 may be similar to a keypad used on a key FOB, TV remote, cellular phone, and the like, and may be lighted or unlighted. Keypad 141 may include indicia indicative of a function such as "lock", "turn lights on/off", etc. Keypad 141 may be used to operate light source 160 described further below. Keypad 141 may be made of virtually any material designed to accommodate the tactile feel such as plastic, rubber, and the like.

The lid 104 is configured to close one end of the enclosure 102 to external mechanical pressure while allowing water and air to enter enclosure 102. For example, the lid 104 includes apertures 105 that allow water to enter the enclosure 102. The lid 104 may be made of floatable or non-floatable materials. However, floatable materials (e.g., materials that have a lower specific gravity than water) such as plastic foam may be advantageous as they add to the bouncy of the inflatable apparatus 100.

In one embodiment, the lid 104 also includes the light source 160. Light source 160 may be a self-contained light source 160 having its own power source (e.g., battery) and activation switch. In one embodiment, the light source 160 includes a pressure-activated switch such that a user may press on the light source to activate the light. In other embodiments, the light source 160 may be activated by other devices such as keypad 141 or may be activated by water pressure as described below.

Figure 2:
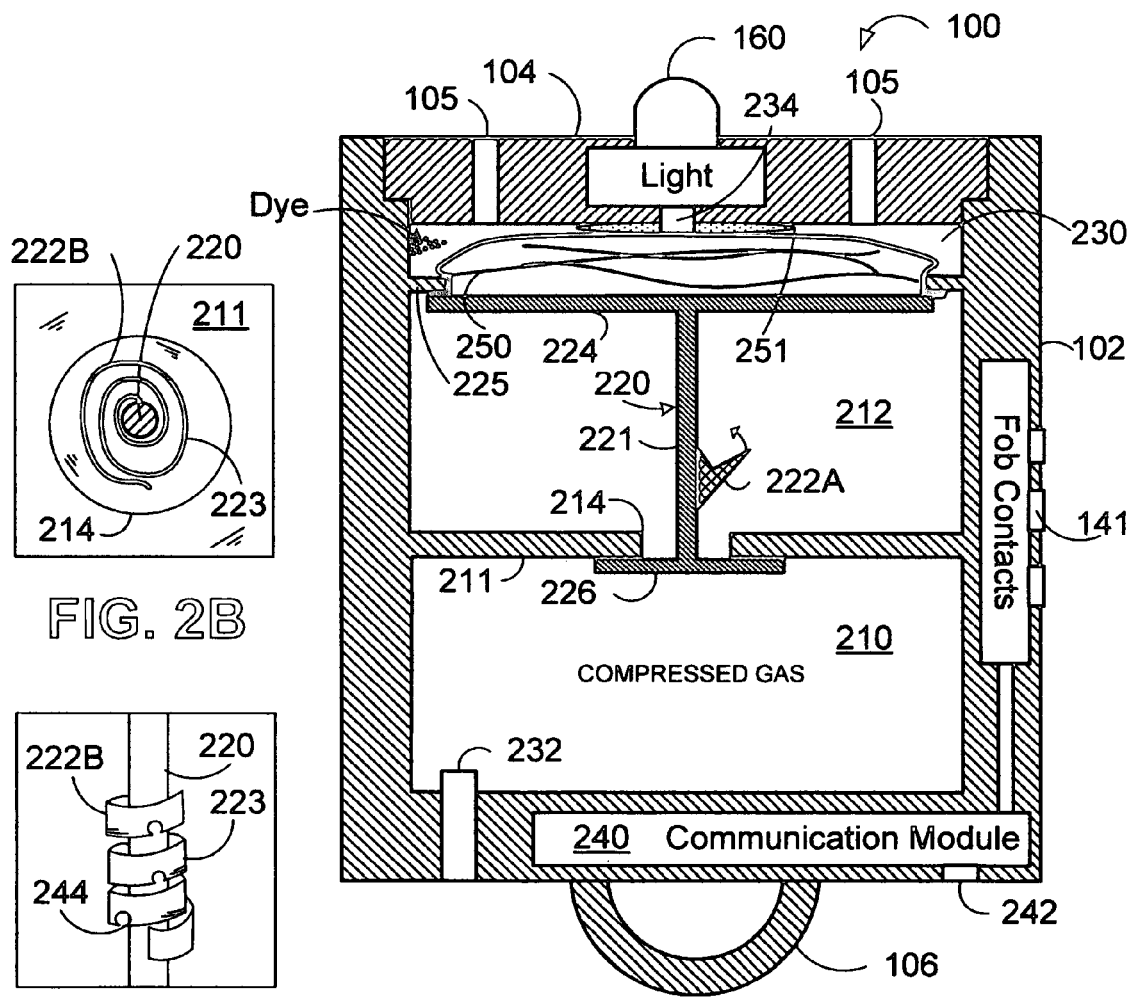
FIG. 2A is a sectional view of one embodiment of the inflatable apparatus of FIG. 1, in accordance with embodiments of the invention.
FIG. 2B is a top view of a latching member in accordance with embodiments of the invention.
FIG. 2C is a partial sectional view of a latching member in accordance with embodiments of the invention.

FIG. 2A is a sectional view of one embodiment of the inflatable apparatus 100 of FIG. 1. The enclosure 102 is divided into a first chamber 210, and a second chamber 212 that are separated by an inner wall 211. The first chamber 210 is configured to hold a gas such as carbon dioxide, nitrogen, and the like, under pressure. The second chamber 212 includes an inflation activation device 220 and an inflatable member 250. The inflation activation device 220 is capable of initiating the inflation of inflatable member 250 when the enclosure 102 is submerged in water. The inflatable apparatus 100 also includes a wireless communication module 240 in communication with the key input 141. The wireless communication module 240 may include its own power source and/or may be activated by water via an optional water inlet 242 as described below.

In one embodiment, the inflation activation device 220 includes a shaft 221 having one end extending though an opening 224 in the inner wall 211 into the first chamber 210 and another end disposed in the second chamber 212. The shaft 221 includes a sealing member 226 on one end of the shaft 221 disposed in the first chamber 210, and an activation member 224 on the other end of the shaft 221 disposed in the second chamber 212. The sealing member 226 is configured to seal the opening 224. In one embodiment, when gas is introduced and compressed into the first chamber 210 via gas inlet 232, the sealing member 226 is pressed against the inner wall 211 by the pressure of the gas around the opening 224 thereby preventing the compressed gas from escaping into the second chamber 212 until the inflation activation device 220 is activated. This is advantageous as the sealing member 226 is supported in a closed position by the force of the gas pressure and not by an external spring or other device that may fatigue over time. The sealing member 226 may also include an O-ring (not shown) positioned between the inner wall 211 and the surface of the sealing member 226 facing the inner wall 211 to provide a further sealing capability.

The activation member 224 is generally sized larger than the sealing member 226 to allow water pressure on side of the activation member 224 adjacent the lid 104 to move the activation device 220 from a closed to an open position. The activation member 224 is held from movement by an optional lip 225 extending into the second chamber 212. Lip 225 is positioned near an opening 230 in the enclosure 102. The lip 225 is capable of attaching the inflatable member 250 to the enclosure 102. For example, the lip 225 may be shaped to allow an inflatable member 250, such as a balloon, to have its open end positioned attached to receive gas entering the second chamber 212 from the first chamber 210. In the deflated state, the lid 104 and the lip 225 form a storage region for the inflatable member 250.

A latching member 222A is coupled to or formed part of the shaft 221. The latching member 222A is configured to latch the inflation activation device 220 into an inflation position once the inflation activation device 220 is activated. For example, the latching member may be shaped similar to a flap or barb that flexes to allow the latching member 222A to pass through the opening 214, but catches on the inner wall 211 to prevent the shaft 221 from moving in the opposite direction. Latching member 222A may include any number of materials such as plastic, metal, wood, and the like, that may be used to advantage.

In one embodiment, the latching member 222A may be formed in a spiral shape, similar to a flexible cloth wrapped around a pole. This configuration allows the latching member 222A to incrementally latch (e.g., latch in more than one position). For example, FIG. 2B and FIG. 2C are a top view and partial sectional view respectively of one embodiment of a spiral version of latching member 222B. Latching member 222B include a ribbon 223 that wraps around the shaft 221. The ribbon 223 may include flexible material such as plastic that allows the latching member 222B to extend through the opening 214.

Once deployed and extended through the opening 214, the flexible material 223 expands (e.g., unfurls) and the edges of the flexible material 223 catch on the edges of the inner wall 211 defining the opening 214. Advantageously, the continuous edge of the ribbon 223 allows the latching member 222B to latch virtually at any point along the ribbon edge. In one embodiment, the ribbon 223 may include a plurality of optional notches 244 to prevent the ribbon 223 from sliding across the edges of the inner wall 211 once deployed.

Figure 3:
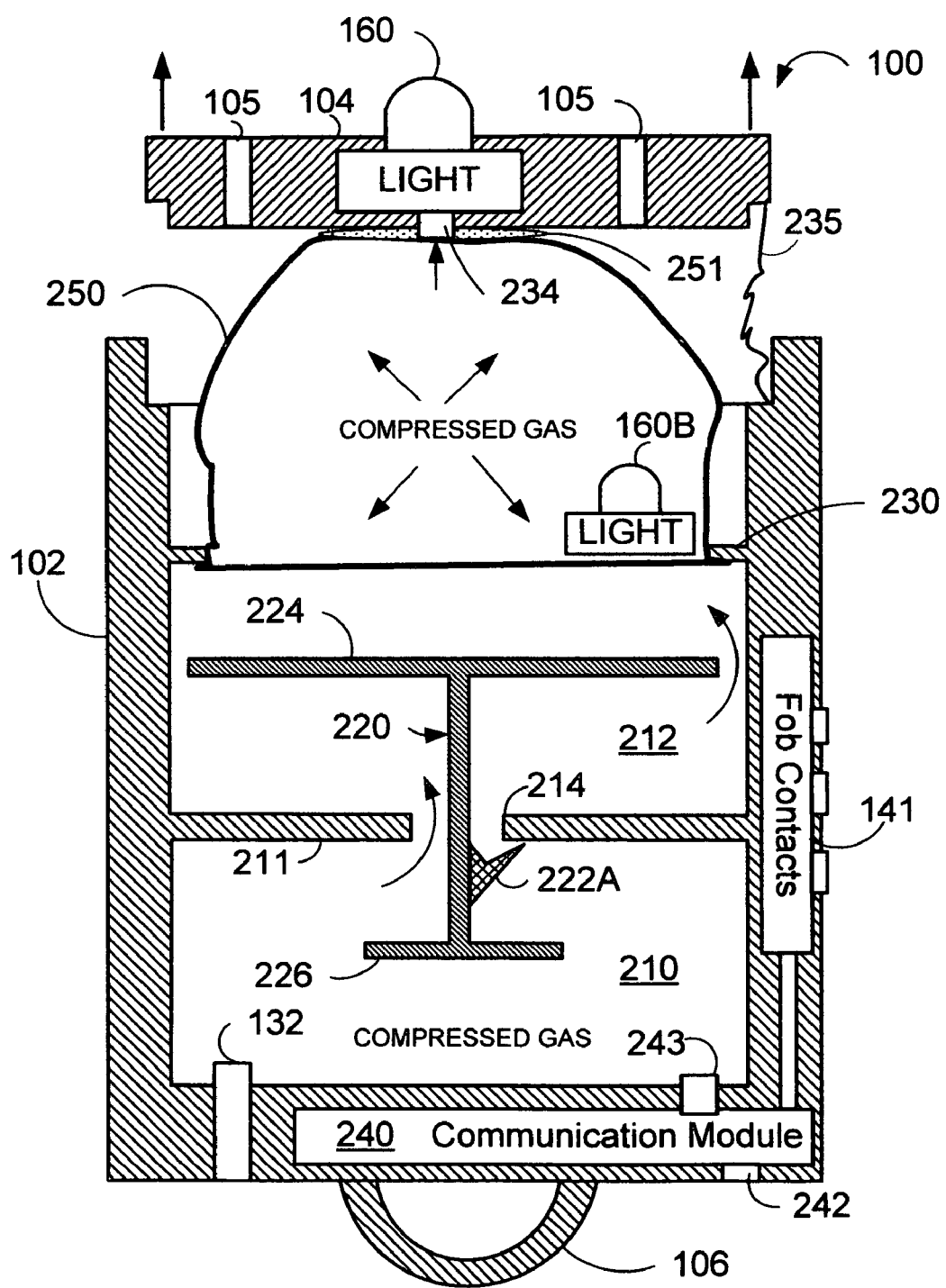
FIG. 3 is a sectional view of one embodiment an inflatable apparatus during inflation in accordance with embodiments of the invention.

FIG. 3 is a sectional view of one embodiment inflatable apparatus 100 during inflation. Illustratively, to activate inflation, water flows through the apertures 105 to fill the cavity 230 defined by the inflation member 250, lip 225, sidewalls of enclosure 102, and the lid 104. In this embodiment, when sufficient water has filled the cavity 230 and the inflatable apparatus 100 is submerged to a predefined depth, water pressure activates the inflation activation device 220. The water pressure forces the activation member 224 toward the first cavity 210. When a sufficient pressure on activation member 224 is reached, the activation member 224 is forced away from the lip 225 and the sealing member 226 is forced, via the shaft 221, away from the opening 214. This allows the compressed gas to escape from the first chamber 210 into the second chamber 212. The compressed gas inflates the inflatable member 250. The inflatable member 250 forces the lid 104 from the enclosure 102 and expands outside, extending from the enclosure 102 until the pressure equalizes between the first chamber 210, the second chamber 212 plus the expanded inflatable member 250.

In one embodiment, the lid 104 is attached to a portion of the inflatable member 250 by an adhesive. This may be advantageous if the lid 104 is buoyant thereby increasing the overall buoyancy of the inflatable apparatus 100. In another embodiment, when the inflatable member 250 expands, it activates a switch 234. The switch 234 activates light source 160. Therefore, in this embodiment, the light source 160 is automatically activated by the inflation of inflatable member 250.

The lid 104 may also be attached by a string 235, fishing type line, and the like, to the enclosure 102 and be allowed to detach and float away from the inflatable apparatus 100 while staying connected. Therefore, in situations where the weight of the objects attached to the inflatable apparatus 100 exceeds a buoyancy limit, the inflatable apparatus 100 can extend the lid 104 as a marker buoy to assist in the retrieval of the objects.

In other embodiments, another light source 160B may be disposed within inflatable member 250. This is advantageous for inflatable members 250 that are translucent when inflated, such as balloons, as the light source 160B may illuminate the inflatable member 250 thereby creating a larger illumination signal than the light source 160 by itself. The light source 160B may be turned off by a switch integral thereto (not shown) when the inflatable member 250 is in a deflated state. For example, light source 160B may be held in an off state between the lid 104 and the activation member 224. When the activation member 224 is activated, pressure on the light switch is released allowing the light source 160B to illuminate the inflatable member 250.

In another embodiment, the wireless communication module 240 may include a pressure switch 243. Pressure switch 243 is activated when the compressed gas is released from the first chamber 210. This allows the wireless communication module 240 to automatically start a homing signal when the inflatable apparatus 100 inflated. While a pressure switch may be used, the wireless communication module 240 may also be activated by water entering the port 242. For example, the water port 242 may include an element such as a battery cell that when exposed to water provides sufficient current and voltage to activate the wireless communication module 240.

Figure 4:
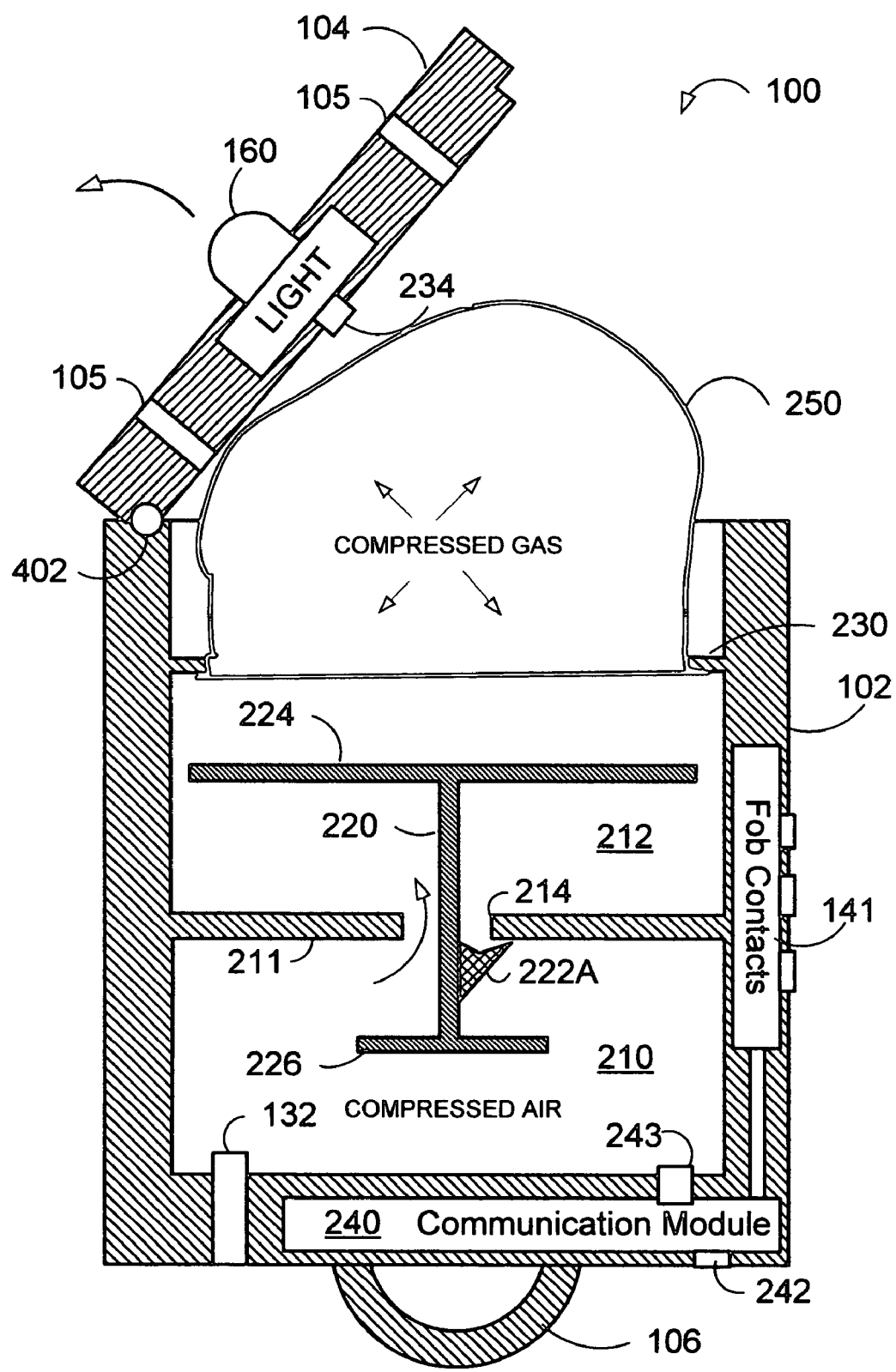
FIG. 4 is a sectional view of one embodiment an inflatable apparatus during inflation having a hinged lid in accordance with embodiments of the invention.

FIG. 4 is a sectional view of one embodiment an inflatable apparatus 100 during inflation having a hinged lid 104 in accordance with embodiments of the invention. Illustratively, the lid 104 may have one end hinged by hinge member 402. Hinge member 402 may include any type of hinge that may be used to advantage. For example, hinge member 402 may be a standard hinge that has a hinge rotation element, similar to a door hinge. In other embodiments, the lid 104 may be flexibly attached on one end to the enclosure 102 such that when the inflatable member 250 expands, the lid 104 rotates around the flexible connection.

For example, an internal elastic member (not shown) may be coupled to an end of the lid 104 and to an end of the enclosure 102.

Figure 5:
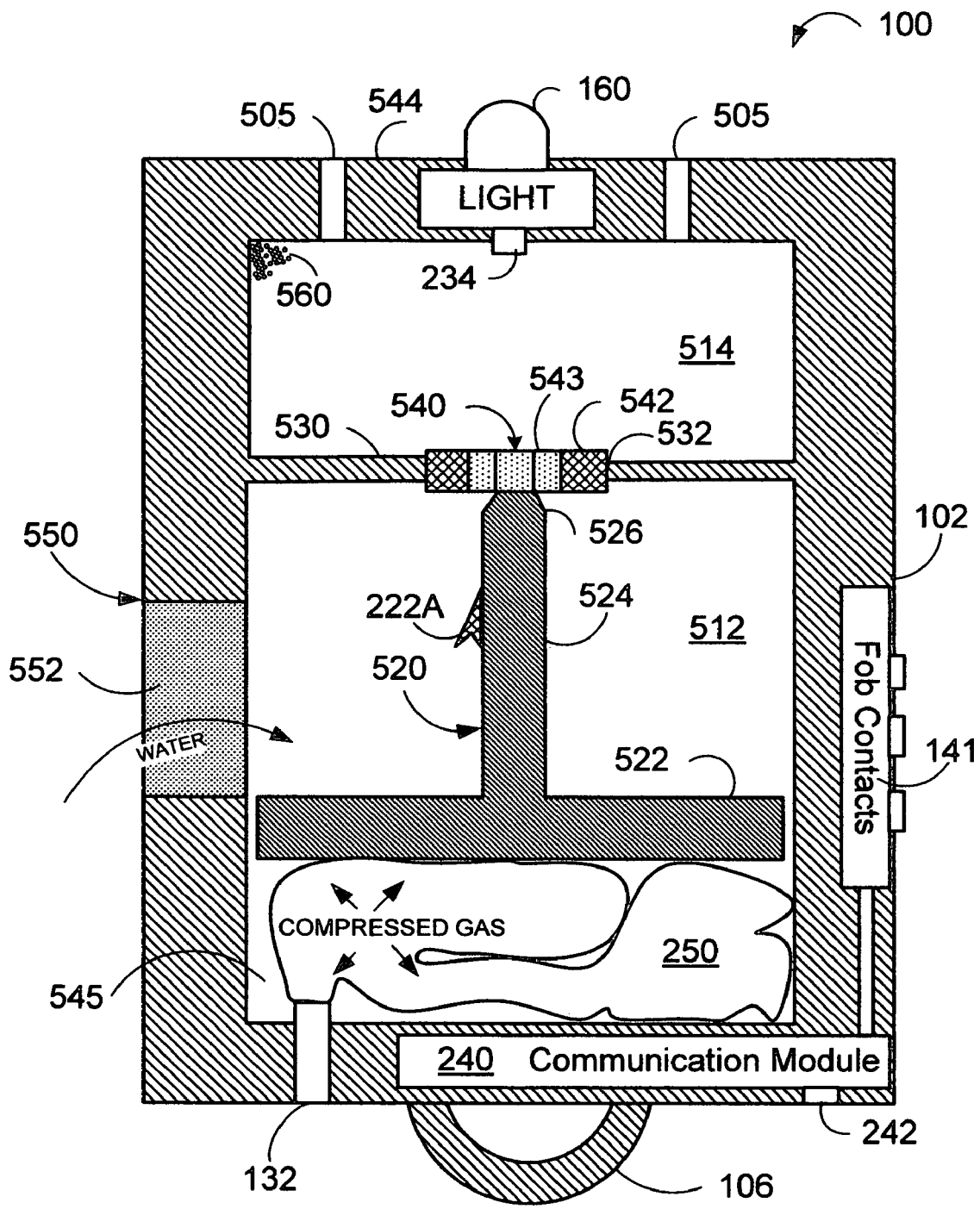
FIG. 5 is a sectional view of one embodiment an inflatable apparatus with a pre-inflated membrane in accordance with embodiments of the invention.

FIG. 5 is a sectional view of one embodiment an inflatable apparatus 100 with a pre-inflated inflatable member 250. In this embodiment, the enclosure 102 includes an inner wall member 530 separating a first chamber 512 from a second chamber 514. The first chamber 512 houses the inflatable member 250 and an inflation activation device 520. The second chamber 514 is defined by the sidewalls of the enclosure 102, top 544 of the enclosure 102, and the inner wall member 530. The top 544 includes optional water inlets 505 that allow water to enter the second chamber 514.

In one embodiment, the inflation activation device 520 is generally formed in a "T" shape having an activation end 526, and a support end 522 disposed on one end of shaft 524, however, other shapes are contemplated. The support end 522 is disposed adjacent a bottom end of the first chamber 512. The support end 522 is configured with a piston like shape that in a non-activated state, in conjunction with the lower end of the first chamber 512 defines a storage region 545 for the inflatable member 250. The storage region 545 is capable of holding the inflatable member 250 in a pre-inflated state. For example, the storage region 545 is capable of holding the inflatable member 250 under about 0–250 PSI or more of pressure in a non-activated state.

The inflation activation device 520 also includes a dissolvable activation member 540. The dissolvable activation member 540 includes an outer ring 542 and a dissolvable center member 543. The outer ring may be formed of any rigid material that may be used to advantage. For example, the outer ring 542 may include metal, plastic, rubber, and the like. The outer ring 542 is configured to support the dissolvable center member 543 within aperture 532. The outer ring 542 may provide a guide to the activation end 526 once the dissolvable center member 543 is dissolved. The dissolvable center member 543 is capable of holding the inflation activation device 520 in an activation ready state. For example, the dissolvable center member 543 is configured sufficiently thick to prevent the activation end 526 from piercing through the dissolvable center member 543.

The enclosure 102 also includes an exit aperture 550 disposed in a sidewall of the first chamber 512. The exit aperture 550 is configured to allow the inflatable member 250 to pass therethough when inflated. To prevent unwanted moisture and other contamination from entering the exit aperture 550, the exit aperture 550 includes an optional seal member 552 disposed therein. The seal member 552 is capable of preventing external contamination for entering the first chamber 512 while, when saturated with water, allows the water to flow into the first chamber 512. For example, the seal member 552 may be composed of plastic foam, cloth, paper, and the like configured to absorb moisture until it is saturated. Once saturated, for example, by emersion into a body of water, the seal member 552 allows water to pass into the first chamber 512. This is advantageous as water can contact the dissolvable center member 543 from a side facing the first chamber 512, and the side facing the second chamber 514, dissolving the dissolvable center member 543 more quickly than if only one side of the dissolvable center member 543 were exposed to water.

Figure 6:
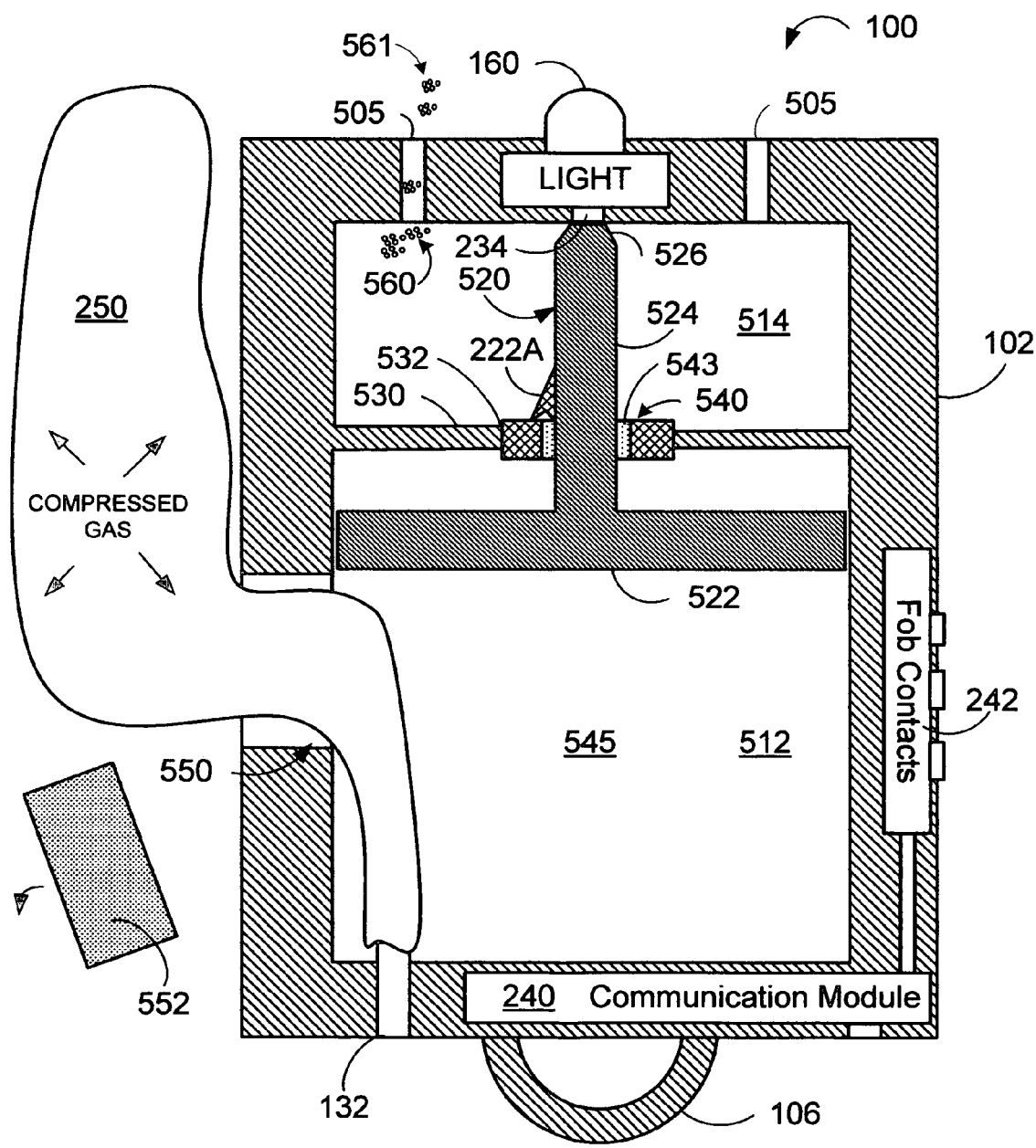
FIG. 6 is a sectional view of one embodiment an inflatable apparatus with a pre-inflated membrane during inflation in accordance with embodiments of the invention.

Illustratively, FIG. 6 is a sectional view of one embodiment an inflatable apparatus 100 with a pre-inflated inflatable member 250 during inflation. When water enters the first and/or second cavity 512, 514, it dissolves the dissolvable center member 543. This allows the activation end 526 to pierce the dissolvable center member 543. Once the dissolvable center member 543 is pierced, the activation end 526, shaft 540, and latching member 222A move into the second chamber 514 though aperture 532, as illustrated in FIG. 6.

As described above, latching member 222A prevents the shaft 540 from moving toward the lower end of the first chamber 512. The movement of the activation end 526 allows the support end 522 to move toward the inner wall member 530 increasing the size of the storage region 545. Once the support end 522 moves past the exit aperture 550, the inflation member 250 is free to expand through the exit aperture 550 and extend outside the enclosure 102 as shown in FIG. 6. In one embodiment, the seal member 552 is ejected from the exit aperture 550 via the pressure from the inflatable member 250. However, it is contemplated that seal member 552, if configured to be buoyant, may be attached to the enclosure 102 to aid in the buoyancy of the inflatable apparatus 100.

In one operational embodiment, the activation end 526 may operate switch 234 turning on the light source 160. This is advantageous as the light source 160 is automatically activated when the inflation activation device 520 is activated provides a light beacon to aid in finding the inflatable apparatus 100.

While embodiments of the present invention are described herein with regard to sound and light in aiding someone in finding an inflatable apparatus once immersed in water, in one embodiment to aid finding the inflatable apparatus 100 a color dye 560 may be stored in the second chamber 212, 514. The dye 560 may be any water-soluble dye, preferably non-toxic, such as a red dye, green dye, blue dye, yellow dye, and the like, that provides a temporary dyed water region adjacent the inflatable apparatus 100 when immersed in a body of water. The dye 560 may be stored in virtually any state that may be used to advantage. For example, the dye 560 may be stored a dry state, or an adhesive state and activated when immersed in water. For example, the dye 560 may be stored in the second chamber 514 in a lump form so as to not "sprinkle" out of the apertures 505. However, when immersed in water, the lump form of dye 560 would then mix with the water entering the apertures 505. The dyed water then is ejected into the surrounding water to create a visual dye marker 561 around the inflatable apparatus 100. Similarly, with regard to second chamber 514, the dye may be placed inside the second chamber 514 until water enters the second chamber 514 via apertures 505.

Figure 7:
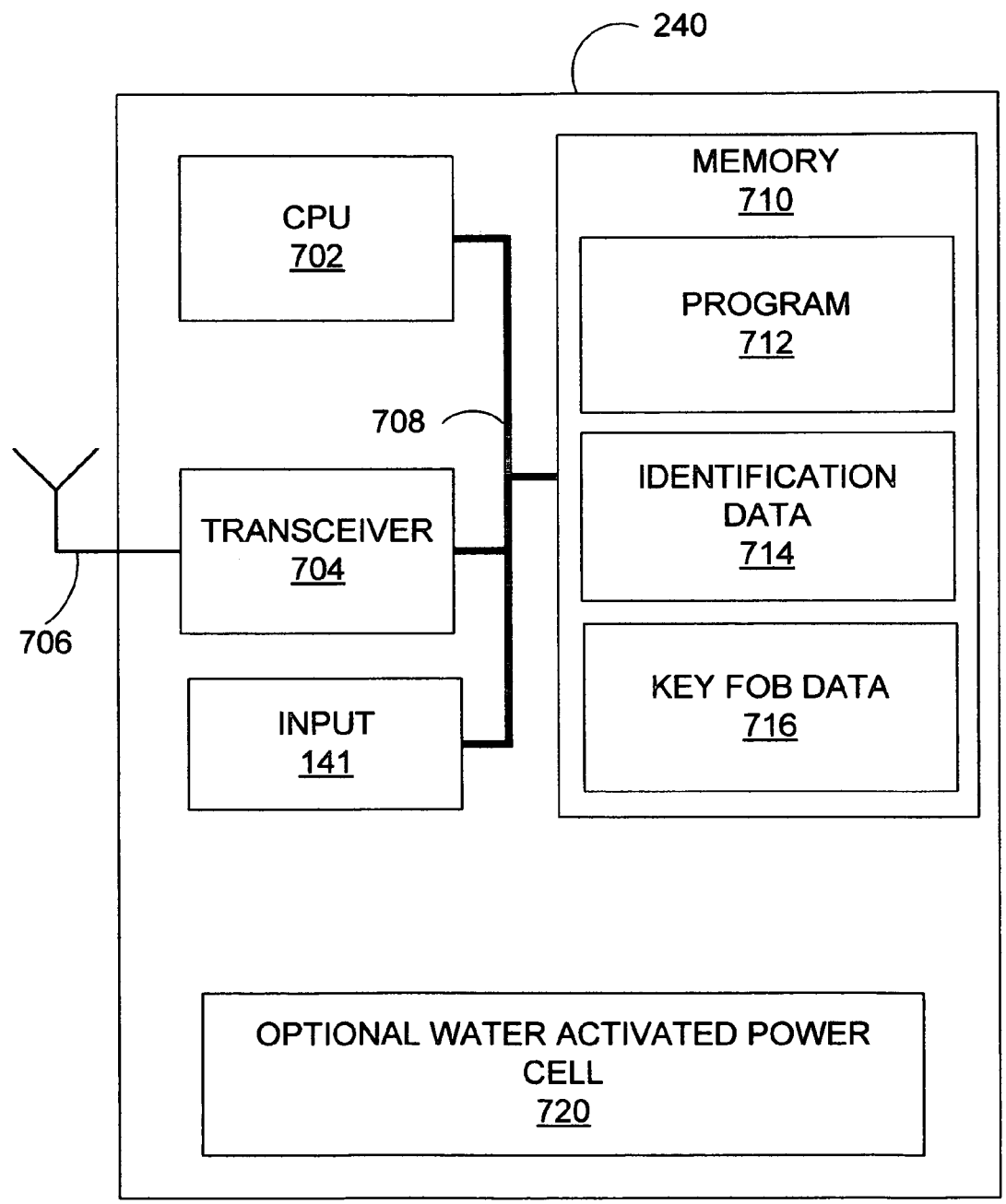
FIG. 7 is a simplified block diagram of one embodiment of an inflatable apparatus wireless communication module in accordance with embodiments of the invention.

FIG. 7 is a simplified block diagram of one embodiment of a wireless communication module 240 used with the inflatable apparatus 100. The wireless communication module 240 may be virtually any type of integrated circuit and/or data processing system such as a microprocessor, field programmable gate array (FPGA), application specific integrated circuit (ASIC), and the like, that may be configured to perform embodiments of the present invention to advantage. In one embodiment, wireless communication module 240 includes a Central Processing Unit (CPU) 702, a transceiver 704, and a memory 710, in communication therewith via a bus 708. CPU 702 may be under the control of an operating system that may be disposed in memory 710. Virtually any operating system or portion thereof supporting the configuration functions disclosed herein may be used. In one embodiment, CPU 702 may be hardwired logic circuitry, and the like, adapted to operate communication module 240.

The transceiver 704 may be any suitable transceiver designed to receive and transmit wireless signals to another transceiver/receiver such as a radio receiver adapted to receive such wireless signals. Any number of wireless communication devices well known in the art may be used to accomplish the reception and transmission of data between the transceiver 704 and external wireless communication systems. For example, the transceiver 704 may be formed from a wireless receiver in combination with a wireless transmitter. The transceiver 704 may use any viable communication link such as ISO 1443, Bluetooth, 802.11x, cellular network, RF, and the like. In other words, virtually any wireless communication module 240 that is sized accordingly and capable of communicating with external wireless communication systems may be used.

The memory 710 can be a non-volatile or volatile memory such as a random access memory that has sufficient space to hold the necessary programming and data structures of the invention. While memory 710 is shown as a single entity, it should be understood that memory 710 may in fact comprise a plurality of modules, and that memory 710 may exist at multiple levels, from high speed registers and caches to lower speed but larger direct random access memory (DRAM) chips. In one embodiment, first memory 710 may include a program 712, identification data 714, and optionally key fob data 716. The program 712 may use any one of a number of different programming languages. For example, the program code can be written in PLC code (e.g., ladder logic), a higher-level language such as C, C++, Java, or a number of other languages. While the program 712 may be a standalone program, it is contemplated that the program 712 may be combined with other programs.

In one embodiment, the program 712 when executed on CPU 702, retrieves identification information from the identification data 714. The program 712 instructs the CPU 702 to wirelessly transmit the identification data, among other data such as user data, and the like, to the external communication systems via the transceiver 704.

While wireless communication module 240 is generally described in terms of wireless communication in regards to electromagnetic waves, it is contemplated that wireless communication module 240 may be configured to emit audible sounds that may travel through water. For example, wireless communication module 240 may be configured to emit an audio signal via an embedded waterproof speaker or other type of sound emitting device. While virtually any audio range is usable with a sound detection system, the audio signal is preferably within the auditory range of humans such that they can hear the audio signal while searching for the inflatable apparatus 100. The audio signal could be a beep, chirp, siren, or virtually any type of signal that may be used to advantage.

Embodiments of the present invention are described herein in terms of wireless communication systems such as defined in IEEE 802.11, and networks such as Wireless Local Area Network (WLAN), Wireless Wide Area Networks (WWAN), and other networks utilizing data packet communication such as the Internet. However, it is understood the present invention is not limited to any particular communication system or network environment. For example, the wireless communication could utilize cellular communication systems (e.g., cellular phone), or could be analog, such as FM or AM transmission, whereby the wireless communication module 240 may be formed as a radio transmitter/transceiver.

As described herein, embodiments of the present invention pertain to specific method steps implementable on computer systems. In one embodiment, the invention may be implemented as a computer program-product for use with a computer system. The programs defining the functions of at least one embodiment can be provided to a computer via a variety of computer-readable media (i.e., signal-bearing medium), which include but are not limited to, (i) information permanently stored on non-writable storage media (e.g. read-only memory devices within a computer such as read only CD-ROM disks readable by a CD-ROM or DVD drive; (ii) alterable information stored on a writable storage media (e.g. floppy disks within diskette drive or hard-disk drive); or (iii) information conveyed to a computer by communications medium, such as through a computer or telephone network, including wireless communication. The latter specifically includes information conveyed via the Internet. Such signal-bearing media, when carrying computer-readable instructions that direct the functions of the invention, represent alternative embodiments of the invention. It may also be noted that portions of the product program may be developed and implemented independently, but when combined together are embodiments of the invention.

From the description herein, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the present invention. The above presents a detailed description of the preferred embodiment (as well as some alternative embodiments) of the present invention.

While the present invention has been described with reference to one or more preferred embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention.

The invention claimed is:

1. An apparatus comprising:
    a body having an outer wall defining a first gas chamber and a second gas chamber separated by an inner wall;
    a water pressure activated latching valve having a sealing end disposed in the first gas chamber, wherein the sealing end is configured to seal an opening disposed in the inner wall to prevent gas disposed in the first gas chamber from escaping into the second chamber until the pressure activated valve is activated by water pressure;
    an inflatable membrane disposed in the second chamber, wherein when the pressure activated latching valve is activated by water pressure communicated though an opening in the outer wall to an exterior side of the membrane, the pressurized gas disposed in the first gas chamber is communicated though the opening in the inner wall to inflate the membrane, wherein in response to the pressurized gas, the inflatable membrane extends outside the body though the opening in the outer wall; and a transceiver configured to provide a location wireless signals in response to an external input or activation of inflatable membrane.

2. The apparatus of claim 1, further comprising a floatable lid configured to cover one end of the second gas chamber, wherein the floatable lid is configured to allow water passage therethrough and prevent activation of the pressure activated valve by a user of the apparatus.

3. The apparatus of claim 2, wherein the floatable lid comprises one or more orifices configured to allow the passage of water molecules through the floatable lid.

4. The apparatus of claim 2, wherein the floatable lid is attached to an external surface of the membrane with an adhesive.

5. The apparatus of claim 1, wherein the latching valve comprises a pressure sensing end that when exposed to water pressure moves from a sealed position to an open latched position to activate the latching valve.

6. The apparatus of claim 1, further comprising a key FOB contact terminal in communication with the transceiver, wherein the key FOB contact terminal programs the transceiver to emit a wireless signal in response to a user input.

7. The apparatus of claim 1, wherein the inflatable membrane is disposed in the first chamber and is configured to contain the pressure of the first chamber in a deflated position, wherein the sealing end forms the inner wall and is positioned adjacent to and in contact with the inflatable membrane.

8. The apparatus of claim 1, further comprising a second inner wall, wherein the second inner wall includes a water dissolvable member integrated into a second opening of the second inner wall.

9. The apparatus of claim 8, wherein the water dissolvable member is configured to hold an activation end of the pressure activated valve in a first position, wherein when dissolved by water, the water dissolvable member allows the passage of the activation end though the second opening, wherein the sealing end is moved by pressure formed by the pressurized gas in the inflatable member to an activation position allowing the inflatable member to inflate.

10. An automatic inflatable apparatus, the apparatus comprising:
a body having a first chamber and a second chamber;
a movable wall slidably disposed in the first chamber;
a shaft attached to the movable wall on a first end;
an internal wall disposed within the body to separate the first chamber from the second chamber, wherein the internal wall includes a first opening sized to allow the shaft to pass therethrough;
a water dissolvable member disposed in the first opening, wherein another end of the shaft distal the first end abuts the water dissolvable member, wherein when the dissolvable member is not dissolved by water, the movable wall is held by the dissolvable member in a first position, wherein when the water dissolvable member is dissolved by water, the shaft is capable of passing through the first opening to position the movable wall in a second position; and
an inflatable member disposed in the first chamber between the movable wall and a wall of the first chamber, wherein when the dissolvable member is not dissolved, the inflatable member is enclosed in the first chamber by the movable wall, wherein when the dissolvable member is dissolved, at least a portion of the inflatable member expands from the first chamber to an exterior position though a second opening in a second wall of the body.

11. The apparatus of claim 10, further comprising a light source that switches on in response to the shaft moving to the second position.

12. The apparatus of claim 10, further comprising a wireless transmitter configured to transmit a location signal when the apparatus is submerged in water.

13. The apparatus of claim 10, further comprising a wireless transmitter configured to transmit a vehicle operational signal.

14. The apparatus of claim 10, further comprising a wireless transmitter configured to transmit a garage door operational signal.

15. An inflatable apparatus configured to hold keys and other items, the apparatus comprising:
an enclosure;
an inflatable membrane disposed within the enclosure;
an inflation activation apparatus configured to move from a ready state to an activation state when the apparatus is submerged in a body of water, wherein in the activation state the inflatable membrane expands through an opening in an outer wall of the enclosure under gas pressure to provide buoyancy for the apparatus in the body of water; and
a latching mechanism configured to prevent the inflation activation apparatus from returning to the ready state.

16. The apparatus of claim 15, wherein the enclosure comprises a first chamber capable of holding pressurized gas used to inflate the inflatable membrane.

17. The apparatus of claim 15, wherein the inflation activation apparatus comprises a water dissolvable member disposed in the opening, wherein when exposed to water, the water dissolvable member allows the inflation activation apparatus to move from a first position to a second position, wherein the second position facilitates the inflation of the inflatable member.

18. The apparatus of claim 15, further comprising a wireless transmitter integral to the enclosure, wherein the wireless transmitter is configured to provide a user selected wireless signal in the ready state or a location signal in response to the activation state.

19. The apparatus of claim 15, wherein the enclosure comprises an inner wall having, an opening therein to communicate pressurized as from a first chamber to a second chamber in communication with the inflatable membrane, wherein the inflation activation apparatus seals the opening in the ready state and unseals the opening in the activation state to allow pressurized gas to communicate from the first chamber to the second chamber to inflate the inflatable membrane.

20. The apparatus of claim 19, wherein the inflation activation apparatus comprises a sealing member on one end of a shaft and an activation member on another end of the shaft, wherein the sealing member is disposed in the first chamber and is held in a sealing position over the opening by a compressed gas when the apparatus is in the ready state, and held in a non-sealing position by the latching apparatus when the apparatus is in the activation state.

* * * * *